(12) United States Patent
McCall et al.

(10) Patent No.: US 8,927,795 B2
(45) Date of Patent: *Jan. 6, 2015

(54) PROCESS FOR CONTROLLING THE SIMULTANEOUS PRODUCTION OF DIESEL AND JET FUEL RANGE PARAFFINS BY BLENDING FEEDSTOCKS

(75) Inventors: Michael J. McCall, Geneva, IL (US); Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/475,630

(22) Filed: May 18, 2012

(65) Prior Publication Data

US 2013/0305591 A1    Nov. 21, 2013

(51) Int. Cl.
*C10L 1/04* (2006.01)
*C10L 1/08* (2006.01)
*C10G 3/00* (2006.01)

(52) U.S. Cl.
USPC .............. 585/240; 585/14; 44/300; 44/605; 208/15

(58) Field of Classification Search
USPC ........................ 585/14, 240; 44/300
See application file for complete search history.

(56) References Cited

U.S. PATENT DOCUMENTS

| | | | |
|---|---|---|---|
| 7,816,570 B2 * | 10/2010 | Roberts et al. ............... 585/240 |
| 7,897,824 B2 | 3/2011 | Aulich et al. | |
| 8,029,579 B2 | 10/2011 | Knuth et al. | |
| 8,058,492 B2 * | 11/2011 | Anumakonda et al. ......... 585/14 |
| 8,198,492 B2 * | 6/2012 | Brady et al. ..................... 585/14 |
| 8,314,274 B2 * | 11/2012 | Marker et al. ................. 585/240 |
| 8,324,438 B2 * | 12/2012 | Brandvold et al. ............. 585/240 |
| 8,329,970 B2 * | 12/2012 | Harlin et al. ................... 585/240 |
| 8,350,102 B2 * | 1/2013 | Roberts et al. ................. 585/240 |
| 8,350,103 B2 * | 1/2013 | Roberts et al. ................. 585/240 |
| 8,581,013 B2 * | 11/2013 | Abhari et al. .................... 585/14 |
| 2009/0158637 A1 * | 6/2009 | McCall et al. ................... 44/308 |
| 2009/0162264 A1 * | 6/2009 | McCall et al. ................. 422/187 |
| 2009/0229172 A1 | 9/2009 | Brady et al. | |
| 2009/0253947 A1 | 10/2009 | Brandvold et al. | |
| 2011/0105812 A1 | 5/2011 | Marker et al. | |
| 2012/0157727 A1 * | 6/2012 | Parimi et al. ................... 585/240 |
| 2012/0165581 A1 * | 6/2012 | Dupassieux et al. .......... 585/240 |
| 2013/0102818 A1 * | 4/2013 | Roberts et al. ................. 585/240 |

FOREIGN PATENT DOCUMENTS

WO    WO 2009/025663 A1    2/2009

OTHER PUBLICATIONS

UOP Renewable Jet Fuel Technology to Produce . . . http://www.greencarcongress.com/2009/10/uop-200910001.htm Retrived Apr. 13, 2012, pp. 1-2.
Feed-Flexible Processing . . . , AIChE Meeting, 09/23/20087 http://www.aiche.org/uploadedFiles/Conferences/DepartmentUploads/PDF/2008_Midwest_Regional_McCall_GreenJet.pdf; pp. 1-25.
Bio Aviation Fuel, World Biofuels Markets Congress, Brussels Belgium, Mar. 12-14, 2008, http://www.ascension-publishing.com/BIZ/HD48.pdf, pp. 1-25.

* cited by examiner

*Primary Examiner* — Ellen McAvoy

(57) ABSTRACT

A process for controlling the simultaneous production of hydrocarbons with boiling points in both the diesel fuel range and the aviation fuel range from renewable feedstocks originating from plants or animals other than petroleum feedstocks is described. The hydrocarbon product can be adjusted by changing the feedstocks without requiring different process equipment.

18 Claims, 1 Drawing Sheet

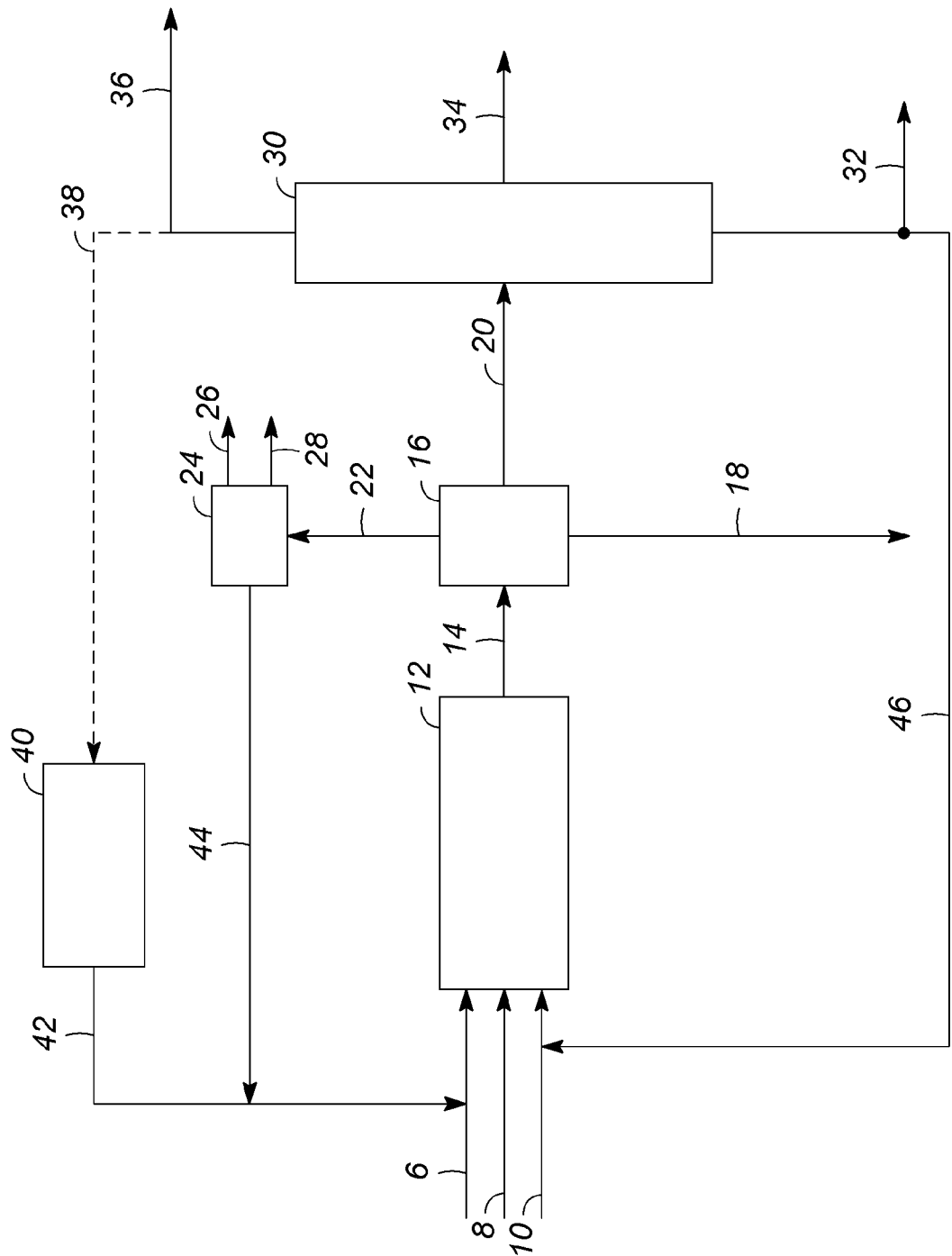

PROCESS FOR CONTROLLING THE SIMULTANEOUS PRODUCTION OF DIESEL AND JET FUEL RANGE PARAFFINS BY BLENDING FEEDSTOCKS

FIELD OF THE INVENTION

This invention relates to a process for producing diesel and jet fuel boiling range hydrocarbons useful as diesel fuel and aviation fuel from renewable feedstocks such as the glycerides and free fatty acids found in materials such as plant oils, animal oils, animal fats, and greases. The process involves blending at least two renewable feedstocks having different carbon chain lengths.

BACKGROUND OF THE INVENTION

As the demand for fuels such as aviation fuel increases worldwide, there is increasing interest in sources other than petroleum crude oil for producing the fuel. One source is renewable feedstocks including, but not limited to, plant oils such as corn, jatropha, camelina, rapeseed, canola, soybean and algal oils, animal fats such as tallow, fish oils, and various waste streams such as yellow and brown greases and sewage sludge. The common feature of these feedstocks is that they are composed of mono- di- and tri-glycerides, and free fatty acids (FAA). Another class of compounds appropriate for these processes is fatty acid alkyl esters (FAAE), such as fatty acid methyl ester (FAME) or fatty acid ethyl ester (FAEE). These types of compounds contain aliphatic carbon chains generally having from about 8 to about 24 carbon atoms. The aliphatic carbon chains in the glycerides, FFAs, or FAAEs can be saturated or mono-, di- or poly-unsaturated. Most of the glycerides in the renewable feed stocks will be triglycerides, but some may be monoglycerides or diglycerides. The monoglycerides and diglycerides can be processed along with the triglycerides.

There are references disclosing the production of hydrocarbons from oils. For example, U.S. Pat. No. 4,300,009 discloses the use of crystalline aluminosilicate zeolites to convert plant oils (e.g., corn oil) to hydrocarbons (e.g., gasoline), and chemicals (e.g., para-xylene). U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

SUMMARY OF THE INVENTION

One aspect of the present invention relates to a process for controlling the simultaneous production of a diesel component comprising hydrocarbons having boiling points in the diesel fuel range and an aviation component comprising hydrocarbons having boiling points in the aviation fuel range from a renewable feedstock. In one embodiment, the process involves identifying target specifications required for the diesel component and for the aviation component. The yields required for the diesel component and for the aviation component that meet the target specifications are determined. A mixture of at least two renewable feedstocks with different fatty acid carbon chain distributions is determined that results in the predetermined yields required for the diesel component and for the aviation component wherein the diesel component and the aviation component further meet the identified specifications. The at least two renewable feedstocks are then mixed to form the mixture. The mixture is hydrogenated and deoxygenated by contacting the mixture in a hydrogenation and deoxygenation zone with a hydrogenation and deoxygenation catalyst at hydrogenation and deoxygenation conditions to provide a hydrogenation and deoxygenation zone effluent comprising n-paraffins. At least a portion of the n-paraffins in the hydrogenation and deoxygenation zone effluent is isomerized by contacting the n-paraffins with an isomerization catalyst in the presence of hydrogen at isomerization conditions in an isomerization zone to generate branched-paraffins in an isomerization zone effluent. The isomerization zone effluent is fractionated to provide a first product stream comprising the diesel component and a second product stream comprising the aviation component at substantially the predetermined yields and target specifications.

BRIEF DESCRIPTION OF THE DRAWING

The FIGURE is a general flow schematic of one embodiment of a process.

DETAILED DESCRIPTION OF THE INVENTION

A process for controlling the simultaneous production a hydrocarbon product stream having hydrocarbons with boiling points in the diesel and aviation fuel range from renewable feedstocks originating from plants or animals other than petroleum feedstocks has been developed. The hydrocarbon product can be adjusted by selecting the feedstocks with appropriate fatty acid carbon chain distributions, without requiring different process equipment, more severe processing, and/or production of increased levels of lower value side products A process has been developed to produce green diesel from natural oils and fats. The process involves deoxygenating renewable feedstocks with carbon chain lengths in the diesel range to produce n-paraffins with both the same number of carbons as the fatty acid chain or one carbon less if the oxygen was removed by decarboxylation. Because the majority of the natural oils and fats have carbon chain lengths of mostly C18, and a minor amount of C16, the deoxygenation step produces C15-C18 n-paraffins. In an optional second stage of the process, the n-paraffins are isomerized to improve the cold properties of the resulting diesel range paraffins. The isomerization is optimized to obtain high levels of isomerization without high levels of secondary cracking reactions. Thus, after the process the majority of the isoparaffins are in the range of C15 to C18 with side cracking producing only minor amounts of isoparaffins smaller than C15. Consequently, the existing process design produces only small amounts of paraffins in the jet fuel range, typically C9 to iC15.

The present invention involves blending naturally occurring oils and fats with different carbon chain lengths, allowing higher yields of jet range paraffins with little or no modifications to the existing process. There are many examples of natural oils and fats containing fatty acid distributions different from the majority that contain mostly C16 and C18 fatty acids. Examples include coconut oil, palm kernel oil, and cuphea oil; all of which have fatty acid distributions in the aviation fuel carbon chain length range. The variety of oils and fats with fatty acid distributions different from the current majority that contain C16 and C18 fatty acids is likely to increase with increased energy crop development, algal oil development, and genetically modified plants and microbes.

As stated, the process produces a hydrocarbon product stream having hydrocarbons with boiling points in both the diesel fuel range and the aviation fuel range from renewable feedstocks originating from plants or animals rather than petroleum feedstocks. Therefore, one portion of the hydrocarbon product is useful as diesel fuel or a diesel fuel blending component, and another portion is useful as an aviation fuel or an aviation fuel blending component.

The yield of diesel fuel can be about 95 wt % to about 5 wt %, or about 90 wt % to about 10 wt %, or about 80 wt % to about 20 wt %, or about 70 wt % to about 30 wt %, or about 60 wt % to about 40 wt %. The yield of aviation fuel can be about 95 wt % to about 5 wt %, or about 90 wt % to about 10 wt %, or about 80 wt % to about 20 wt %, or about 70 wt % to about 30 wt %, or about 60 wt % to about 40 wt %.

The term renewable feedstock is meant to include feedstocks other than those obtained directly from petroleum crude oil. Another term that has been used to describe this class of feedstocks is renewable fats and oils. The renewable feedstocks that can be used in the present invention include any of those which comprise glycerides and free fatty acids (FFA). Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm kernel oil, crambe oil, and the like. Biorenewable is another term used to describe these feedstocks. The glycerides, FFAs, and fatty acid alkyl esters, of the typical vegetable oil or animal fat contain aliphatic hydrocarbon chains in their structure which have about 8 to about 24 carbon atoms with a majority of the oils containing high concentrations of fatty acids with 16 and 18 carbon atoms. Mixtures or co-feeds of renewable feedstocks and fossil fuel derived hydrocarbons may also be used as the feedstock. Other feedstock components may be used if the carbon chain length is well-defined before mixing with renewable oils to allow meeting desired yields and specifications for diesel and aviation range paraffins. Examples of a co-feed component in combination with the above listed feedstocks, include spent motor oil and industrial lubricants, used paraffin waxes, liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a fossil fuel based or other process into a valuable co-feed component to the current process.

The hydrocarbon product streams generated in the present invention are suitable for, or as a blending component for, uses such as an aviation fuel and diesel fuel. Depending upon the application, various additives may be combined with the fuel composition generated in order to meet required specifications for different specific fuels. The specifications could include physical characteristics, chemical characteristics, or both. The specifications could be industry standard, government, and/or military fuel standard specifications. In particular, the hydrocarbon product stream in the diesel fuel range generated herein complies with, is a blending component for, or may be combined with one or more additives to meet ASTM D975, EN590 and/or F76. Similarly, the hydrocarbon product stream in the aviation fuel range generated herein complies with, is a blending component for, or may be combined with one or more additives to meet at least one of: ASTM D 7566 Specification for Aviation Turbine Fuel Containing Synthesized Hydrocarbons, ASTM D 1655 Specification for Aviation Turbine Fuels Defense Stan 91-91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MW-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein, and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8, defined by Military Specification ML-DTL-83133, which is a military grade type of highly refined kerosene based jet propellant specified by the United States Government. The fuel produced from glycerides or FAA as described herein is very similar to isoparaffinic kerosene or iPK, also known as a synthetic paraffinic kerosene (SPK) or synthetic jet fuel.

The process allows an operator to select the specific type of aviation fuel or blending component, and diesel fuel or blending component to be produced and thus the specifications of the fuels/components and the relative yields of each so long as the yields selected allow the fuel specifications to be met. Then, an appropriate blend of renewable feedstocks with well defined fatty acid carbon chain composition is determined so that the effluent of the reaction zone comprises the hydrocarbons necessary to meet the desired fuel specifications. The hydrocarbons produced in the isomerization are separated into two product streams in a fractionation zone: the first product stream comprising the hydrocarbons in the diesel boiling range and meeting the specifications selected for the diesel component, and the second product stream comprising the hydrocarbons in the aviation boiling range and meeting the specification selected for the aviation component. A small byproduct stream of light hydrocarbons is also generated. This stream can be converted to useful hydrogen via standard steam reforming, if desired.

The process provides operators with a great deal of flexibility without large changes in the process or process severity. Different grades of fuels may be produced at different times as the market demands change, and the relative yields of the diesel component and the aviation component may be changed with market demands, as well. Feedstock availability and pricing may also result in a need to control the process. The process can be adjusted as needed to accommodate changing requirements for different fuel specifications or yields.

Renewable feedstocks that can be used in the present invention may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous, as well as solids, water and detergents. An optional first step is to remove as much of these contaminants as possible.

One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed, using either upflow or downflow. Another technique involves contacting the renewable feedstock with a bleaching earth, such as bentonite clay, in a pretreatment zone.

Another possible means for removing contaminants is a mild acid wash. This is carried out by contacting the feedstock with an acid such as sulfuric, nitric, phosphoric, or hydrochloric and water in a reactor. The acidic aqueous solution and feedstock can be contacted either in a batch or continuous process. Contacting is done with a dilute acid solution usually at ambient temperature and atmospheric pressure. If the contacting is done in a continuous manner, it is usually done in a counter current manner.

Yet another possible means of removing metal contaminants from the feedstock is through the use of guard beds which are well known in the art. These can include alumina guard beds either with or without demetallation catalysts such as nickel or cobalt. Various forms of aluminas are suitable.

Filtration and solvent extraction techniques are other choices which may be employed. Hydroprocessing, such as that described in U.S. application Ser. No. 11/770,826, is another pretreatment technique which may be employed. Hydrolysis may be used to convert triglycerides to a contaminant mixture of free fatty acids and hydrothermolysis may be used to convert triglycerides to oxygenated cycloparaffins.

The renewable feedstocks are flowed to a reaction zone or stage comprising one or more catalyst beds in one or more reactor vessels. Within the reaction zone or stage, multiple beds or vessels may be employed, and where multiple beds or vessels are employed, interstage product separation may or may not be performed between the beds or vessels. The term feedstock is meant to include feedstocks that have not been treated to remove contaminants, as well as those feedstocks purified in a pretreatment zone or an oil processing facility. The renewable feedstocks, with or without additional liquid recycled from one or more product streams, may be mixed in a feed tank upstream of the reaction zone, mixed in the feed line to the reactor, or mixed in the reactor itself. In the reaction zone, the renewable feedstocks are contacted with a multifunctional catalyst or set of catalysts comprising deoxygenation, hydrogenation, and isomerization functions in the presence of hydrogen.

A number of reactions occur concurrently within the reaction zone. The order of the reactions is not critical to the invention, and the reactions may occur in various orders. One reaction occurring in the reaction zone is hydrogenation to saturate olefinic compounds in the reaction mixture. Another type of reaction occurring in the reaction zone is deoxygenation. The deoxygenation of the mixture may proceed through different routes such as decarboxylation, where the feedstock oxygen is removed as carbon dioxide, decarbonylation, where the feedstock oxygen is removed as carbon monoxide, and/or hydrodeoxygenation, where the feedstock oxygen is removed as water. Decarboxylation, decarbonylation, and hydrodeoxygenation are herein collectively referred to as deoxygenation reactions.

Sufficient isomerization to prevent poor cold flow properties is needed. Aviation fuel and aviation blending components must have better cold flow properties than is achievable with essentially all n-paraffins, and another reaction occurring in the reaction zone is isomerization to isomerize at least a portion of the n-paraffins to branched paraffins. The yield of isomerization needed is dependent on the specifications required for the final fuel product. Some fuels require a lower cloud or freeze point, and thus need a greater yield from the isomerization reaction to produce a larger concentration of branched-paraffins. Alternatively, depending on the product properties targeted, and the blend of feedstocks used, the isomerization step may not be absolutely necessary.

Previously, in order to convert the diesel range fuel into a fuel useful for aviation, the larger chain-length paraffins, prepared by deoxygenation of fatty acid feedstocks with more typical carbon number distributions rich in C16 and C18, were hydrocracked. Typical hydrocracking processes often caused over-cracking of the paraffins and generated a large quantity of less valuable low molecular weight molecules. In order to avoid the problem of over-cracking, suitable blends of renewable feedstocks containing the desired mixture of chain lengths are selected depending on the grade and amounts of diesel and aviation fuel desired.

As mentioned above, the multifunctional catalyst or set of catalysts comprise deoxygenation, hydrogenation, and isomerization functions. The catalyst function for deoxygenation and hydrogenation will be similar to those already known for hydrogenation or hydrotreating. The deoxygenation and hydrogenation functions, which may be the same or separate active sites, may be noble metals such as a platinum group metals including but not limited to ruthenium, rhodium, palladium, platinum, and mixtures thereof, supported on a high surface area carrier material such as alumina, silica, silica-alumina, magnesium oxide, titania, zirconina, activated carbon and others known in the art, at levels ranging from about 0.05 to about 10 weight-% of the catalytic composite. Examples of other active sites that may be employed to provide the deoxygenation and hydrogenation functions are sulfided base metals such as sulfided NiMo or sulfided NiW. A base metal is a metal which oxidizes when heated in air, and other base metals, in addition to nickel, molybdenum and tungsten, which may be a catalyst component herein include iron, lead, zinc, copper, tin, germanium, chromium, titanium, cobalt, rhenium, indium, gallium, uranium, dysprosium, thallium and mixtures and compounds thereof. Sulfided base metal catalysts may optionally be supported on carrier material such as alumina, silica, silica-alumina, magnesium oxide, activated carbon and others known in the art, or may alternately be used without additional support components, Catalyst functions and conditions for isomerization are well known in the art. See for example US 2004/0230085 A1 which is incorporated by reference in its entirety. Due to the presence of hydrogen, these reactions may also be called hydroisomerization.

Overall, the isomerization of the paraffinic product can be accomplished in any manner known in the art or by using any suitable catalyst known in the art. In general, catalysts or catalytic components having an acid function and mild hydrogenation function are favorable for catalyzing the isomerization reaction. For a single multi-component catalyst, the same active site employed for deoxygenation can also serve as the mild hydrogenation function for the isomerization reactions. In general, suitable isomerization catalysts comprise a metal of Group VIII (IUPAC 8-10) of the Periodic Table and a support material. Suitable Group VIII metals include platinum and palladium, each of which may be used alone or in combination. The support material may be amorphous or crystalline, or a combination of the two. Suitable support materials include, aluminas, amorphous aluminas, amorphous silica-aluminas, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MgAPSO-11, MgAPSO-31, MgAPSO-41, MgAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and U.S. Pat. No. 5,208,005. MgAPSO is a MeAPSO, which is an acronym for a metal aluminumsilicophosphate molecular sieve, where the metal Me is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. Nos. 5,510,306, 5,082,956, and U.S. Pat. No. 5,741,759.

The isomerization catalyst function may also comprise a modifier selected from the group consisting of lanthanum, cerium, praseodymium, neodymium, phosphorus, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. Nos. 4,310,440; 4,440,871; 4,793,984; 4,758,419; 4,943,424; 5,087,347; 5,158,665; 5,208,005; 5,246,566; 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2$:$Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The process to convert blends of natural oils and fats to aviation range paraffins at high iso/normal ratios operates at a range of conditions that successfully allows very high levels of deoxygenation and hydrogenation and provides significant yields of diesel range, and aviation range paraffins while minimizing light gas and naphtha production. Therefore, the operating conditions in many instances are refinery or processing unit specific. They may be dictated in large part by the construction and limitations of the existing unit, which normally cannot be changed without significant expense, the composition of the feed, and the desired products. The inlet temperature of the catalyst bed should be in the range of from about 150° C. to about 454° C. (about 300° F. to about 850° F.), and the inlet pressure should be above about 1379 kPa gauge to about 13,790 kPa gauge (200 to about 2,000 psig). The feed stream is admixed with sufficient hydrogen to provide hydrogen circulation rate of about 168 to 1684 SL/L (1000 to 10000 SCF/barrel, hereafter SCFB) and passed into the reactor containing the catalyst or set of catalysts. The hydrogen will be primarily derived from a recycle gas stream which may pass through purification facilities for the removal of acid gases. The hydrogen rich gas admixed with the feed, and in one embodiment, any recycle hydrocarbons will contain at least 90 mol percent hydrogen. The feed rate in terms of liquid hourly space velocity (L.H.S.V.) will normally be within the broad range of about 0.3 to about 5 $hr^{-1}$, with a L.H.S.V. below 1.2 being used in one embodiment.

The different reactions types, hydrogenation, deoxygenation, and isomerization, may be carried out using the same catalyst or using a set of different catalysts. Examples of catalysts suitable for all reaction types include, but are not limited to, platinum and/or palladium on: zeolite Y, ZSM-5, amorphous silica alumina, MOR, SAPO-11 and/or SM3. Another example is sulfided nickel and molybdenum on: zeolite Y, ZSM-5, amorphous silica alumina, MOR, SAPO-11 and/or SM3.

Hydrogen is a reactant in the reactions above, and to be effective, a sufficient quantity of hydrogen must be in solution to most effectively take part in the catalytic reaction. If hydrogen is not available at the reaction site of the catalyst, then coke forms on the catalyst and deactivates it. To solve this problem, the pressure in a reaction zone is often raised to ensure that enough hydrogen is available to avoid coking reactions on the catalyst. The present process is flexible regarding the operating pressure so that an operator can respond to economic conditions by shifting the deoxygenation pathway. For example, when hydrogen is not too expensive relative to feed cost, an operator may choose to run at higher pressure to favor hydrodeoxygenation and maximize product yield. Suitable pressures may range up to about 5171 kPa gauge (750 psig), 5515 kPa gauge (800 psig), 5860 kPa gauge (850 psig), about 6205 Pa gauge (900 psig), 6895 kPa gauge (1000 psig), or 8274 kPa gauge (1200 psig). However, higher pressure operations are more costly to build and to operate as compared to their lower pressure counterparts. An advantage of one embodiment of the present invention is that the operating pressure may be in the range of about 1379 kPa absolute (200 psia) to about 4826 kPa absolute (700 psia) which is lower than is traditionally used in a deoxygenation zone. In another embodiment, the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, with the increased hydrogen in solution, the rate of reaction is increased resulting in a greater amount of throughput of material through the reactor in a given period of time. The process is flexible regarding pressure so that the operator can respond to economic conditions by shifting the deoxygenation pathway. That is, an operator may run at low pressure to favor decarboxylation when hydrogen is expensive, but sacrifice some yield in the final product through the loss of carbon. On the other hand, when hydrogen is not too expensive relative to the feed cost, the operator may choose to run at higher pressures to favor hydrodeoxygenation and maximize product yield.

In one embodiment of the invention, the desired amount of hydrogen is kept in solution at lower pressures by employing a large recycle of hydrocarbon. Other exothermic processes have employed hydrocarbon recycle in order to control the temperature in the reaction zones. However, in the present process, the amount of recycle is not determined based on the temperature control requirements, but rather is based upon hydrogen solubility requirements. Hydrogen has a greater solubility in the hydrocarbon product than it does in the feedstock. The range of recycle to feedstock ratios that may be used herein is set based on the need to control the level of hydrogen in the liquid phase and therefore reduce the deactivation rate. By utilizing a large hydrocarbon recycle, the solubility of hydrogen in the liquid phase in the reaction zone is greatly increased, and higher pressures are not needed to increase the amount of hydrogen in solution and avoid catalyst deactivation at low pressures. In one embodiment of the invention, the volume ratio of hydrocarbon recycle to feedstock is from about 0.5:1 to about 8:1. In another embodiment, the ratio is in the range of about 2:1 to about 6:1. In another embodiment, the ratio is in the range of about 3:1 to about 6:1, and in yet another embodiment, the ratio is in the range of about 4:1 to about 5:1. The ranges of suitable volume ratios of hydrocarbon recycle to feedstock are described in pending application U.S. application Ser. No. 12/193,149. Suitable ranges for hydrogen solubility were shown to begin at about a recycle to feed ratio of about 2:1. From recycle to feed ratios of about 2:1 through 6:1, the simulation of U.S. application Ser. No. 12/193,149 showed that the hydrogen solubility remained high. Thus, the specific range of vol/vol ratios of recycle to feed for this embodiment is determined based on achieving a suitable hydrogen solubility in the deoxygenation reaction zone.

It is important to note that the recycle is optional, and the process does not require it. Complete deoxygenation and hydrogenation may be achieved without recycle components. In still another embodiment, the process may be conducted with continuous catalyst regeneration in order to counteract the catalyst deactivation effects of the lower amounts of hydrogen in solution or the higher operating conditions.

The product of the reaction zone is conducted to a separator to remove the byproducts of the reaction zone reactions. Either a cold or a hot separator may be used. When a cold separator is used, the water is removed as a liquid from the bottom of the separator, and when a hot separator is used, the water is removed as a vapor in the overhead stream of the separator. Therefore, the overhead stream from the separator comprises at least propane and light ends, carbon oxides, and hydrogen sulfide. Additionally, the overhead stream from the separator may comprise water vapor. The carbon oxides and hydrogen sulfide may be removed be techniques such as scrubbing. Suitable scrubbing techniques are described in U.S. application No. 60/973,792 and U.S. application No. 60/973,816, each hereby incorporated by reference in its entirety. After the carbon oxides and/or the hydrogen sulfide has been removed from the overhead stream, the propane and other light ends are directed to an optional steam reforming zone, discussed below. If the separator is operated as a hot separator and water vapor is present in the separator overhead, the water is optionally retained in the carbon oxide and hydrogen sulfide scrubber, condensed from the hydrocarbon stream, or co-fed with the light ends to the steam reformer. The temperature of the separator may be from about ambient temperature to about 454° C. (about 850° F.), and the pressure may be from about 1379 kPa gauge to about 13,790 kPa gauge (200 to about 2,000 psig). In one embodiment, the temperature is from about 150° C. to about 454° C. (about 300° F. to about 850° F.).

The paraffins produced in the reaction zone are removed from the separator and carried to a fractionation zone to separate the paraffins into different product ranges. Naphtha and any LPG may be separated into an overhead stream from the fractionation zone. A portion of the naphtha may be optionally conducted to the steam reforming zone. The range of hydrocarbons that satisfy the requirements for a specific aviation fuel is removed from the fractionation zone. The range of hydrocarbons that satisfy the requirements of the specific diesel fuel are removed from the fractionation zone, as well, either as a sidecut, or as a bottoms stream from the fractionation reactor, depending on whether or not there are any paraffins that have boiling points higher than that of the desired diesel fuel. Those heavier paraffins may be removed in a bottoms stream from the fractionation zone. The operating conditions of the fractionation zone may be varied depending upon the feedstock, the type of paraffins generated in the reaction zone, and the desired fuel to be produced.

Optionally, the process may employ a steam reforming zone in order to provide hydrogen to the hydrogenation/deoxygenation zone, and/or isomerization zone. The steam reforming process is a well known chemical process for producing hydrogen, and is the most common method of producing hydrogen or hydrogen and carbon oxide mixtures. A hydrocarbon and steam mixture is catalytically reacted at high temperature to form hydrogen, and the carbon oxides: carbon monoxide and carbon dioxide. Since the reforming reaction is strongly endothermic, heat must be supplied to the reactant mixture, such as by heating the tubes in a furnace or reformer. A specific type of steam reforming is autothermal reforming, also called catalytic partial oxidation. This process differs from catalytic steam reforming in that the heat is supplied by the partial internal combustion of the feedstock with oxygen or air, and not supplied from an external source. In general, the amount of reforming achieved depends on the temperature of the gas leaving the catalyst; exit temperatures in the range of about 700° C. to about 950° C. are typical for conventional hydrocarbon reforming. Pressures may range up to about 4000 kPa absolute. Steam reforming catalysts are well known and conventional catalysts are suitable for use in the present invention.

Typically, natural gas is the most predominant feedstock to a steam reforming process. However, in the present invention, hydrocarbons that are too light for the desired product may be generated at any of the reaction zones. For example, in the deoxygenation zone, propane is a common by-product. Other C1 to C3 paraffins may be present, as well. These lighter components may be separated from the desired portion of the deoxygenation effluent and routed to the steam reforming zone for the generation of hydrogen. Similarly, paraffins having eight or less carbon atoms from the effluent of the isomerization step may be conducted to the reforming zone. Therefore, the lighter materials from the deoxygenation and isomerization zones may be directed to a reforming zone along with steam. In the reforming zone, the lighter hydrocarbons and steam are catalytically reacted to form hydrogen and carbon oxides. The steam reforming product may be recycled to any of the reaction zones to provide at least hydrogen to the reaction zone. Optionally, the hydrogen may be separated from the carbon oxides generated in the steam reforming reaction, and the separated hydrogen may be recycled to any of the reaction zones. Since hydrogen produced from natural gas is an expensive resource and generates unwanted greenhouse gases, generating at least a portion of the required hydrogen from the undesired renewable products of the reaction zones can decrease the cost of the process and make it more environmentally friendly. This feature becomes more valuable when an external source of hydrogen is not readily available. Another alternative is autothermal reforming, which has the added advantage of low utilities costs.

In an alternative embodiment, catalytic reforming may be employed instead of steam reforming. In a typical catalytic reforming zone, the reactions include dehydrogenation, dehydrocyclization, isomerization and hydrocracking. The dehydrogenation reactions typically will be the isomerization of alkylcyclopentanes to alkylcyclohexanes, the dehydrogenation of paraffins to olefins, the dehydrogenation of cyclohexanes to alkylcycloparaffins, and the dehydrocyclization of acyclic paraffins and acyclic olefins to aromatics. The isomerization reactions included isomerization of n-paraffins to isoparaffins, the hydroisomerization of olefins to isoparaffins, and the isomerization of substituted aromatics. The hydrocracking reactions include the hydrocracking of paraffins. The aromatization of the n-paraffins to aromatics is generally considered to be highly desirable because of the high octane rating of the resulting aromatic product. In this application, the hydrogen generated by the reactions is also a highly desired product because it can be recycled to hydrogenation/deoxygenation zone, or the isomerization zone. The aromatics and cycloparaffins that are generated would add to the diesel fuel and or the aviation fuel depending upon boiling point. Addition of ring compounds to the SPK will result in increased density, which may be desirable.

Turning to the FIGURE, a blend of two or more renewable feedstocks 6, 8, 10 enter the reaction zone 12 along with make-up hydrogen stream 42 and optional hydrocarbon recycle 46. Contacting the blend of renewable feedstocks with the multifunctional catalyst or set of catalysts generates hydrogenated, deoxygenated, and isomerized reaction zone effluent 14. Reaction zone effluent 14 is introduced into separator 16. Carbon oxides, possibly hydrogen sulfide and C3 and lighter components are separated and removed in line 22. Depending on whether the separator is operated in a hot or cold mode, water may be removed as a vapor in line 22 (hot separator mode) or as a liquid in line 18 (cold separator mode). In hot separator mode, an additional stream (not shown) may be removed from 24 discussed below. Optionally, reaction zone 12 may include a separation zone (not shown) to remove some portion of reaction gases and/or water at an intermediate stage of renewable feedstock deoxygenation, as discussed above. The overhead in line 22 comprises excess hydrogen not consumed in the reactions and the carbon dioxide from the decarboxylation reaction. The carbon dioxide can be removed from the excess hydrogen by means well known in the art, such as reaction with an aqueous inorganic alkaline solution, pressure swing absorption, etc. Also, absorption with an amine in processes such as described in applications U.S. application Ser. No. 12/193,176 and U.S. application Ser. No. 12/193,196, hereby incorporated by reference, may be employed. If desired, essentially pure carbon dioxide can be recovered by regenerating the spent absorption media. Therefore, line 22 is passed through a scrubber system 24, such as amine scrubbers, to remove carbon dioxide in line 28 and hydrogen sulfide in line 26. Depending upon the scrubber technology selected, some portion of water may also be retained by the scrubber. Hydrogen-rich gas is conducted via line 44 to ultimately combine with feedstock 10. A small purge of stream 44 may be included (not shown) to control recycle gas hydrogen purity.

A liquid stream containing jet fuel and diesel fuel range paraffins and some lighter hydrocarbons is removed from separator 16 in line 20 and conducted to product fractionation zone 30. Product fractionation zone 30 is operated so that product cut 34 contains the hydrocarbons in a boiling range most beneficial to meeting the desired aviation fuel specifications. Product cut 34 is collected for use as aviation fuel or as a blending component of aviation fuel. The lighter materials such as naphtha and LPG are removed in fractionation zone overhead stream 36. A portion of stream 36 may be conducted in line 38 to reforming zone 40, and hydrogen in line 42 may be recycled to combine with feedstock 10. Optionally, an external source of hydrocarbon feed may be introduced to reforming zone 40 (not shown). Optionally, an additional source of hydrogen (not shown) can be used. If desired, the naphtha and LPG may be further separated into an LPG stream and a naphtha stream (not shown).

Hydrocarbons that have a boiling point higher than acceptable for the specification of the aviation fuel are removed in bottoms stream 32. A portion of bottoms stream 32 may be recovered and used as fuel such as, for example, low sulfur heating oil fuel, ethylene plant feedstock, feed to lube plant, paraffinic solvent or dielectric oil. It is likely that bottoms stream 32 may be acceptable for use as diesel or a diesel blending component. A portion of bottoms stream 32 is recycled to the reaction zone. A portion of a hydrocarbon stream may also be cooled down if necessary and used as cool quench liquid between beds of the reaction zone to further control the heat of reaction and provide quench liquid for emergencies. The recycle stream may be introduced to the inlet of the reaction zone and/or to any subsequent beds or reactors. One benefit of the hydrocarbon recycle is to control the temperature rise across the individual beds. However, as discussed above, the amount of hydrocarbon recycle may be determined based upon the desired hydrogen solubility in the reaction zone and to minimize the cracking severity per pass to result in high selectivity to aviation range paraffins. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation.

The following example is presented in illustration of this invention and is not intended as an undue limitation on the generally broad scope of the invention as set out in the appended claims.

Example

Palm oil, coconut oil, and cuphea oil could be blended in a mass ratio of 40:40:20. Deoxygenation would occur through either hydrodeoxygenation (HDO) or decarboxylation (DeCOx) with the loss of one carbon from the fatty acid chain in DeCOx. Both reactions could occur at the same time. The example assumes 50% of the oxygen is removed via HDO and 50% by DeCOx. Therefore, the second half of Table 1 shows an even amount of even and odd paraffins corresponding to the carbon chain lengths in the blended feed. As demonstrated in Table 1, the 40:40:20 blend of palm oil, coconut oil and cuphea oil would result in a product blend containing approximately 60% aviation fuel-range hydrocarbons (assuming a final distillation boiling point of 270° C.), and approximately 30% diesel range hydrocarbons, with a small amount of light hydrocarbon by-product. Any excess cracking accompanying the isomerization stage would likely result in slightly more low boiling products, with the longer chain length paraffins cracking preferentially over the shorter ones.

TABLE 1

| | | | | | | | | | % fatty acid composition | | | | | | | | | | | |
|---|---|---|---|---|---|---|---|---|---|---|---|---|---|---|---|---|---|---|---|---|
| | | | | | | | | | Carbon Chain Length | | | | | | | | | | | |
| | | 5 | 6 | 7 | 8 | 9 | 10 | 11 | 12 | 13 | 14 | 15 | 16 | 17 | 18 | 19 | 20 | 21 | 22 | 23 | 24 |
| Feedstock Natural Oil | | | | | | | | | | | | | | | | | | | | | | |
| Soybean Oil | | 0 | 0 | 0 | 0 | 0 | 0 | 0 | 0 | 0 | 0 | 0 | 11.1 | 0 | 88.4 | 0 | 0.3 | 0 | 0 | 0 | 0 |
| Coconut | | 0 | 0.5 | 0 | 8 | 0 | 6.4 | 0 | 48.5 | 0 | 17.6 | 0 | 8.4 | 0 | 10.5 | 0 | 0.1 | 0 | 0 | 0 | 0 |
| Cuphea lanceolata | | 0 | 0 | 0 | 0 | 0 | 88 | 0 | 2 | 0 | 1 | 0 | 0 | 0 | 0 | 0 | 0.3 | 0 | 0 | 0 | 0 |
| Camelina Oil | | | | | | | | | | | | | 6 | | 71 | | 19 | | 4 | | |
| Palm Oil | | 0 | | 0 | 0.3 | 0 | 0 | 0 | 0.3 | 0 | 1.1 | 0 | 45.2 | 0 | 52.9 | 0 | 0.2 | 0 | 0 | 0 | 0 |
| Deoxygenated Products | % | | | | | | | Deoxygenated paraffin products | | | | | | | | | | | | | | |
| Deoxygenated Coconut oil | 40 | 0 | 0 | 4 | 4 | 3 | 3 | 24 | 24 | 9 | 9 | 4 | 4 | 5 | 5 | 0 | 0 | 0 | 0 | 0 | 0 |
| Deoxygenated Cuphea oil | 20 | 0 | 0 | 0 | 0 | 44 | 44 | 1 | 1 | 1 | 1 | 0 | 0 | 0 | 0 | 0 | 0 | 0 | 0 | 0 | 0 |
| Deoxygenated Palm oil | 40 | 0 | 0 | 0 | 0 | 0 | 0 | 0 | 0 | 1 | 1 | 23 | 23 | 26 | 26 | 0 | 0 | 0 | 0 | 0 | 0 |
| Sum | 100 | 0 | 0 | 2 | 2 | 10 | 10 | 10 | 10 | 4 | 4 | 11 | 11 | 13 | 13 | 0 | 0 | 0 | 0 | 0 | 0 |

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for controlling the simultaneous production of a diesel component comprising hydrocarbons having boiling points in the diesel fuel range and an aviation component comprising hydrocarbons having boiling points in the aviation fuel range from a renewable feedstock comprising:
   identifying target specifications required for the diesel component and for the aviation component;
   determining yields required for the diesel component and for the aviation component that meet the target specifications;
   determining a mixture of at least two renewable feedstocks having different carbon number distributions that results in the predetermined yields required for the diesel component and for the aviation component wherein the diesel component and the aviation component further meet the identified specifications;
   mixing the at least two renewable feedstocks to form the mixture;
   hydrogenating and deoxygenating the mixture by contacting the mixture in a hydrogenation and deoxygenation zone with a hydrogenation and deoxygenation catalyst at hydrogenation and deoxygenation conditions to provide a hydrogenation and deoxygenation zone effluent comprising n-paraffins;
   isomerizing at least a portion of the n-paraffins in the hydrogenation and deoxygenation zone effluent by contacting the n-paraffins with an isomerization catalyst in the presence of hydrogen at isomerization conditions in an isomerization zone to generate branched-paraffins in an isomerization zone effluent wherein the isomerization zone effluent comprises less than 5 wt. % of hydrocarbons having lower boiling points than the aviation component; and
   fractionating the isomerization zone effluent to provide a first product stream comprising the diesel component and a second product stream comprising the aviation component at substantially the predetermined yields and target specifications.

2. The process of claim 1 wherein the specifications required for the diesel component and for the aviation component include physical characteristics, chemical characteristics, or both.

3. The process of claim 2 wherein the specifications are those identified in industry standard, government, or military fuel standard requirements.

4. The process of claim 1 wherein the yield required for the diesel component is from about 10 wt % to about 90 wt %.

5. The process of claim 1 wherein the yield required for the aviation component is from about 10 wt % to about 90 wt %.

6. The process of claim 1 further comprising pre-treating at least one of the renewable feedstocks in a pretreatment zone at pretreatment conditions to remove at least a portion of contaminants in the feedstock.

7. The process of claim 6 where the pretreatment step comprises contacting the renewable feedstock with an acidic ion exchange resin, an acid solution, or bleaching earth material.

8. The process of claim 1 wherein the mixture comprises at least one component selected from glycerides, free fatty acids, fatty acid methyl esters, canola oil, corn oil, soy oils, grapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm oil, fatty acid methyl esters, crambe oil, and kernel oil.

9. The process of claim 1 further comprising recycling a portion of the hydrogenation and deoxygenation zone effluent to the hydrogenation and deoxygenation zone wherein a volume ratio of hydrocarbon recycle to feedstock is in a range of about 0.5:1 to about 8:1.

10. The process of claim 1 further comprising co-feeding or mixing with the renewable feedstocks a component selected from liquids derived from gasification of coal or natural gas followed by a downstream liquefaction, liquids derived from thermal or chemical depolymerization of waste plastics, and other synthetic oils generated as byproducts from petrochemical and chemical processes.

11. The process of claim 1 wherein the hydrogenating and deoxygenating further generates at least propane which is separated from the hydrogenation and deoxygenation zone effluent and conducted to a steam reforming zone to produce at least hydrogen, and the hydrogen being recycled to at least the hydrogenation and deoxygenation zone.

12. The process of claim 1 wherein the isomerization zone effluent further comprises hydrocarbons having 8 or less carbon atoms, and further comprising separating the hydrocarbons having 8 or less carbon atoms from hydrocarbons having 9 or more carbon atoms, the hydrocarbons having 8 or less carbon atoms being conducted to a steam reforming zone to produce at least hydrogen, and the hydrogen being recycled to at least the hydrogenating and deoxygenating zone.

13. The process of claim 1 further comprising mixing one or more additives to the first product stream comprising the diesel component, the second product stream comprising the aviation component, or both.

14. The process of claim 1 wherein the deoxygenation comprises hydrodeoxygenation and decarboxylation.

15. The process of claim 14 wherein a ratio of hydrodeoxygenation reaction to decarboxylation reaction is about 1:1.

16. The process of claim 1 wherein the at least two renewable feedstocks are mixed in a tank before being introduced into the hydrogenation and deoxygenation zone.

17. The process of claim 1 wherein the mixture contains at least three renewable feedstocks.

18. A diesel fuel or diesel fuel blending component and an aviation fuel or aviation fuel blending component as produced by the process of claim 1.

* * * * *